United States Patent [19]

Bachmann et al.

[11] Patent Number: 5,658,024

[45] Date of Patent: Aug. 19, 1997

[54] EXPANSION JOINT WITH A SLOPED CAVITY AND IMPROVED FABRIC CLAMPING

[75] Inventors: Lothar Bachmann; Bradford H. Hilton, both of Auburn, Me.

[73] Assignee: Bachmann Inc., Auburn, Me.

[21] Appl. No.: 390,356

[22] Filed: Feb. 17, 1995

[51] Int. Cl.⁶ .................... F16L 27/00; F16L 55/00
[52] U.S. Cl. ................... 285/299; 285/47; 285/229
[58] Field of Search .................... 285/227, 226, 285/298, 299, 300, 301, 229, 47

[56] References Cited

U.S. PATENT DOCUMENTS

| 2,998,270 | 8/1961 | Watkins | 285/227 |
|---|---|---|---|
| 3,853,336 | 12/1974 | Shank . | |
| 3,874,711 | 4/1975 | Scaizo et al. . | |
| 4,299,414 | 11/1981 | Bachmann | 285/229 |
| 4,548,429 | 10/1985 | Merz | 285/229 |
| 4,659,117 | 4/1987 | Holzhausen et al. | 285/299 |
| 4,685,703 | 8/1987 | Brock | 285/299 |
| 4,732,413 | 3/1988 | Bachmann et al. . | |
| 4,848,803 | 7/1989 | Bachmann . | |
| 5,083,817 | 1/1992 | Holzhausen et al. | 285/299 |
| 5,358,287 | 10/1994 | Winzen | 285/227 |
| 5,443,290 | 8/1995 | Boyer et al. | 285/229 |
| 5,506,376 | 4/1996 | Gödel | 285/227 |

FOREIGN PATENT DOCUMENTS

| 2266095 | 10/1975 | France . |
|---|---|---|
| 3009015 | 1/1991 | Japan . |
| 93000532 | 1/1993 | Japan . |

Primary Examiner—Eric K. Nicholson
Attorney, Agent, or Firm—Banner & Witcoff, Ltd.

[57] ABSTRACT

An expansion joint which employs a flexible material to connect and inlet duct equipment to an outlet duct or equipment includes an inlet frame which is connected to the inlet duct and an outlet frame which is connected to the outlet duct. In a hot frame to cold frame type of expansion joint, the inlet frame, along with an inlet liner is shaped to form a channel which has at least one side which is acutely angled with respect to the primary direction of gas flow through the expansion joint. Expansion joints for use in a cold frame to hot frame and in a hot frame to hot frame application are also described. The expansion joint additionally employs clamps, which clamp the flexible material to the inlet and outlet frames in a manner which reduces the amount of heat to which the flexible material is exposed.

17 Claims, 10 Drawing Sheets

5,658,024

EXPANSION JOINT WITH A SLOPED CAVITY AND IMPROVED FABRIC CLAMPING

FIELD OF THE INVENTION

This invention relates generally to expansion joints and more particularly, though in its broader aspects not limited to, expansion joints for use in applications which are subject to large fluctuations in temperature.

BACKGROUND OF THE INVENTION

Expansion joints which utilize a flexible material to couple portions of a system together are used in a wide variety of applications to allow relative expansion and movement, due to temperature variations, of gas or liquid transport mechanisms such as pipes, ducts and other components which produce or receive the air or liquid. For example, in electrical power plants which utilize gas turbines to generate electrical power, expansion joints are used to connect portions of the ducts which transport the exhaust gas generated by the gas turbine. When operation of the gas turbine is initiated, the temperature of the ducts transporting the exhaust gas can rise from ambient temperature to approximately 1000 degrees farenheit in less than a minute. The high rate at which the temperature rises causes rapid and large variations in the temperature of different portions of the ducting system, including the expansion joint. As will be appreciated by those skilled in the art, such rapid differences in temperature in the components of the ducting system imposes a great deal of stress, also known as thermal shock, on all components of the ducting system and other operative portions of the power generation system.

U.S. Pat. No. 4,848,803 entitled *Fabric Expansion Joints for Exhaust Systems of Gas Turbines* describes an expansion joint which attempts to minimize the thermal shock by utilizing a U-shaped channel in the expansion joint to improve thermal distribution within the joint.

Although the U-shaped channel shown in the above referenced patent improves the thermal distribution within the joint, the discontinuity in the surface of the joint presented by the walls of the U-shaped joint which are perpendicular to the air flow path through the joint, restricts optimal heat distribution through the joint. As a result, the joint continues to be exposed to a high degree of stress, thus reducing the useful life of the joint.

If an expansion joint fractures in a system such as a power generation plant, the power generation mechanism generally has to be shut down while the repair to the expansion joint is made. Large costs are incurred by shutting down the power generation mechanism while the necessary repairs are made. Moreover, a fracture in an expansion joint can cause extremely hot gases to leak out of the ducting system, thus posing a threat to persons who may happen to be in the vicinity of the joint.

It is accordingly, a primary object of the present invention to provide an expansion joint which employs mechanisms which reduce the thermal stress placed on the joint, thus increasing the reliability of the joint.

It is a further, more specific, object of the present invention to provide an expansion joint with a channel which has walls which are sloped at an acute angle with respect to the direction of air flow through the joint, the sloped walls improving the thermal distribution within the joint, thus reducing the stress placed upon the joint, and also providing a geometry which is more tolerant to thermal distortion.

It is an additional object of the present invention to provide an expansion joint with an improved mechanism for clamping the flexible material of the expansion joint to a frame of the joint in order to obtain improved performance of the flexible material when the frame of the expansion joint is subjected to rapid temperature fluctuations.

SUMMARY OF THE INVENTION

In accordance with the present invention, the above objects are achieved in a first preferred embodiment of a hot frame to cold frame type of expansion joint which includes an inlet frame and an inlet liner, connected to form a channel with at least one wall of the channel sloped with respect to the direction of gas flow, the sloped wall of the channel being acutely angled with respect to the mouth of the channel. A portion of the inlet frame is connected to an inlet duct through which gas flows into the expansion joint. The expansion joint further includes an outlet frame and an outlet liner, an end portion of the outlet liner overlapping an end portion of the inlet liner, with the overlapping portion of the inlet liner being on the interior of the expansion joint with respect to the overlapping portion of the outlet liner. A portion of the outlet frame is connected to an outlet duct into which gas flows from the expansion joint. The expansion joint utilizes a flexible material connected at a first end to the inlet frame and at a second end to the outlet frame to allow relative axial and lateral movement of the first frame with respect to the second frame.

In a first alternative embodiment, the principles of the invention are utilized in a cold frame to hot frame expansion joint in which the outlet frame and outlet liner are shaped to form a channel as described above. In a second alternative embodiment, the principles of the invention are utilized in a hot frame to hot frame expansion joint in which a channel with a sloped side is formed, with the inlet frame and inlet channel, at the inlet end of the expansion joint and a similar channel with a sloped side is formed, with the outlet frame and the outlet channel, at the outlet end of the expansion joint.

An advantage is that reliability of the expansion joint is increased by reducing the temperature differential along the frame and liner of the joint. The sloped wall of the channel improves air flow into the channel, thus reducing temperature differentials along the frame and liner. In addition, the sloped geometry allows thermal growth differences to be accepted easier. Thermal stress is thus reduced, leading to increased reliability of the expansion joint. The increased reliability leads to reduced costs and increased safety.

In another aspect of the invention, the channel has two sloped walls, with both walls being acutely angled with respect to the direction of gas flow through the expansion joint. In yet another aspect of the invention, reliability of the expansion joint is further enhanced by employing a clamp which damps the flexible material to the frames of the joint while minimizing the thermal coupling between the frame and the flexible material.

These and other features and advantages of the present invention may be better understood by considering the following detailed description of certain preferred embodiments of the invention. In the course of this description, reference will be made to the attached drawings.

DETAILED DESCRIPTION

Figure 1:
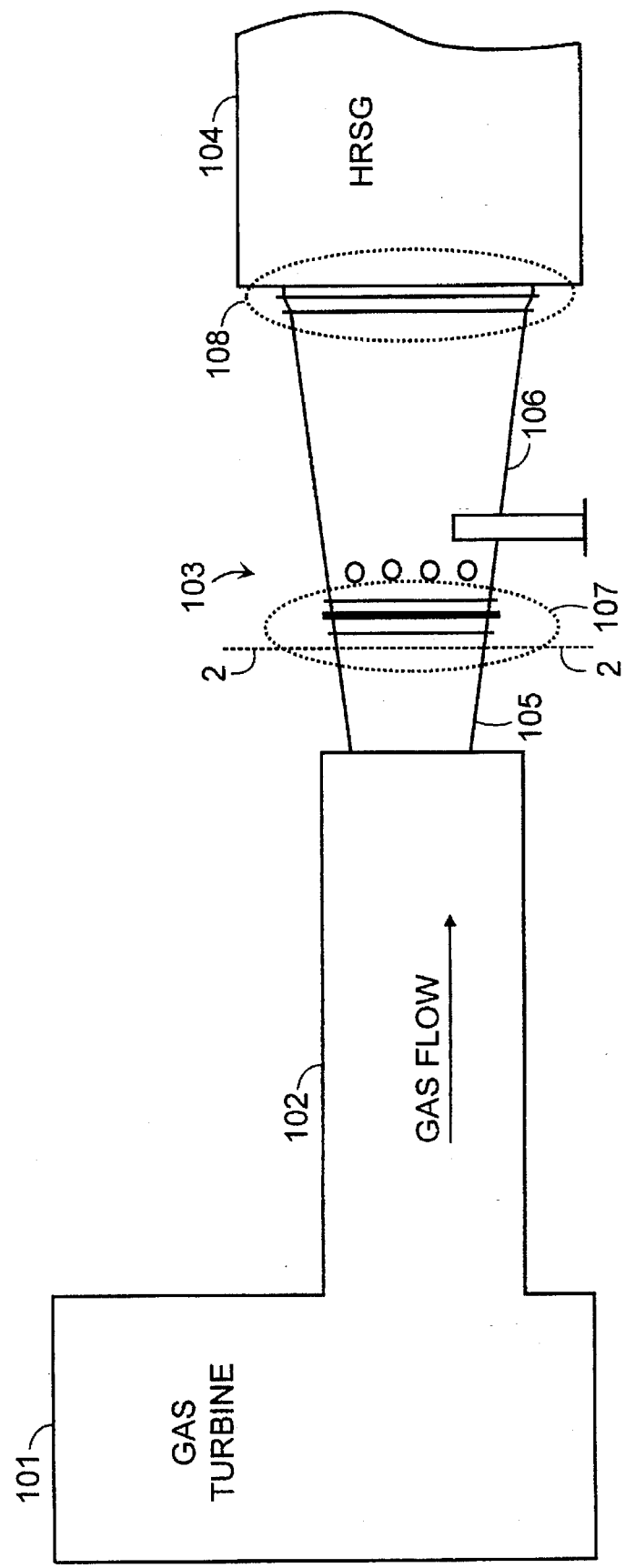
FIG. 1 of the drawings illustrates one use of an expansion joint which utilizes the principles of the invention.

FIG. 1 illustrates one use of an expansion joint which utilizes the principles of the invention. In FIG. 1, a gas turbine power generation system 101 propels exhaust through a duct 102, through a diffuser, seen generally at 103 and into an operative portion of the power generation system such as a Heat Recovery Steam Generator (HRSG) 104. Diffuser 103 is comprised of a first duct portion 105, termed herein an inlet duct, and a second duct portion 106, termed herein an outlet duct. Duct portions 105 and 106 are coupled together by an expansion joint which is seen generally at 107. Expansion joint 107 preferably includes a flexible material which allows relative axial movement of the ducts 105 and 106, in addition to movement normal to the flow path of gas through the diffuser 103. Duct 106 is coupled to the HRSG system via an expansion joint seen generally at 108. Duct portion 105 is externally insulated, and duct portion 106 is internally insulated. The expansion joint 107 is of the hot frame to cold frame type and the expansion joint 108 is shown to be of the cold frame to hot frame type.

As used herein the term hot frame to cold frame expansion joint refers to an expansion joint which is connected to an externally insulated, or hot, duct or equipment at its inlet end, and an internally insulated, or cold, duct or equipment at its outlet end. The term cold frame to hot frame expansion joint refers to an expansion joint which is connected to an internally insulated, or cold, duct or equipment at its inlet end, and an externally insulated, or hot, duct or equipment at its outlet end. The term hot frame to hot frame expansion joint refers to an expansion joint which is connected to an externally insulated, or hot, duct or equipment at both its inlet and outlet ends.

The gas turbine, ducts and HRSG shown in FIG. 1 are of conventional type, and are shown for purposes of explanation of possible uses of an expansion joint which utilizes the principles of the invention. Other uses such as in boilers, incineration plants and petrochemical plants will be apparent to those skilled in the art in view of the present disclosure.

Figure 2A:
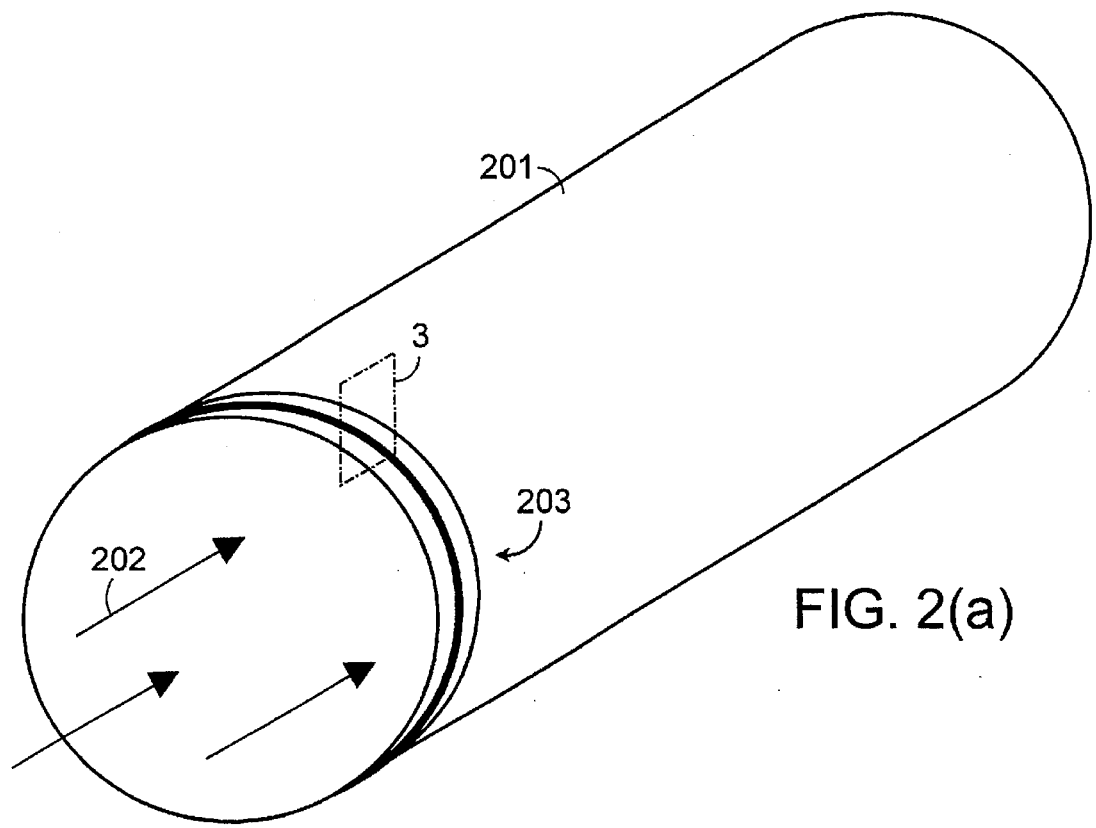
FIGS. 2(a) and 2(b) are views of embodiments of an expansion joint as seen from the upstream or inlet end of the joint.
Figure 2B:
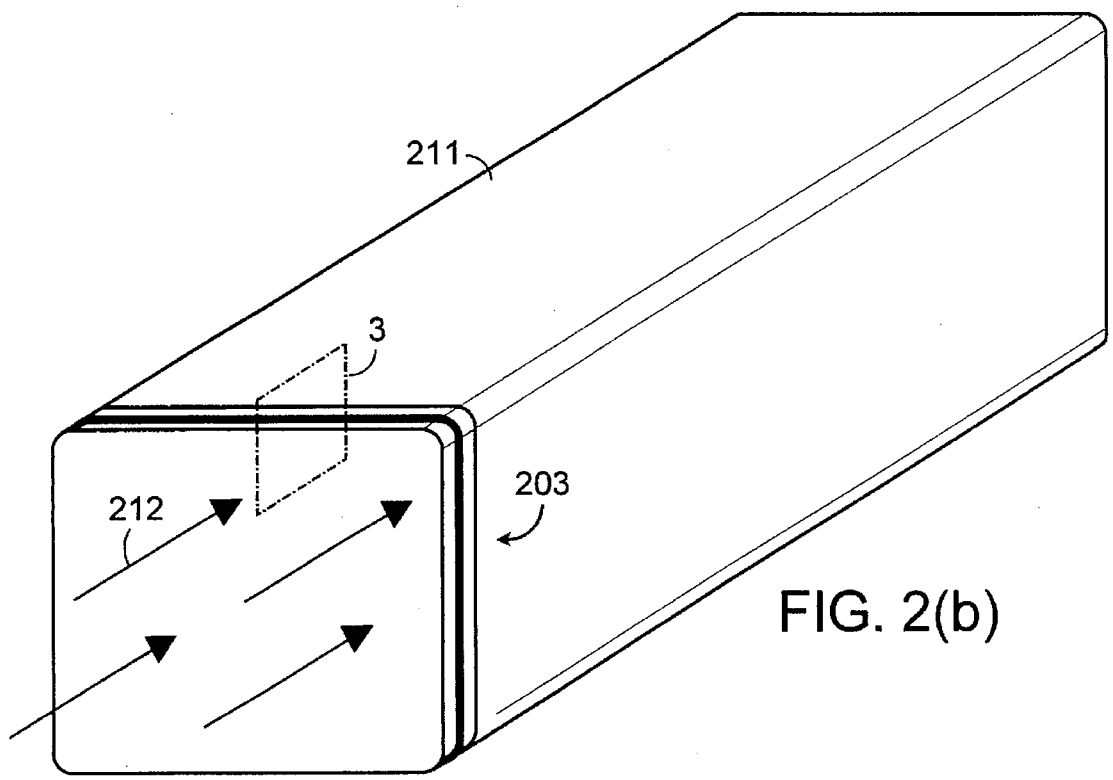

FIGS. 2(a) and 2(b) of the drawings are views looking into an inlet end of expansion joints of the hot frame to cold frame type which utilize the principles of the invention. FIGS. 2(a) and 2(b) show a view taken approximately along the indicated line 2—2 in FIG. 1. FIG. 2(a) shows a duct portion 201 which is generally circular in cross-section, and FIG. 2(b) shows a duct portion 211 which is generally rectangular in cross-section. Duct portions 201 and 211 are shown illustratively to correspond to duct portion 106 of FIG. 1. The direction of gas flow into duct portions 201 and 211 is designated generally by arrows 202 and 212. An expansion joint of the hot frame to cold frame type can be seen generally at 203 and 213.

Figure 3:
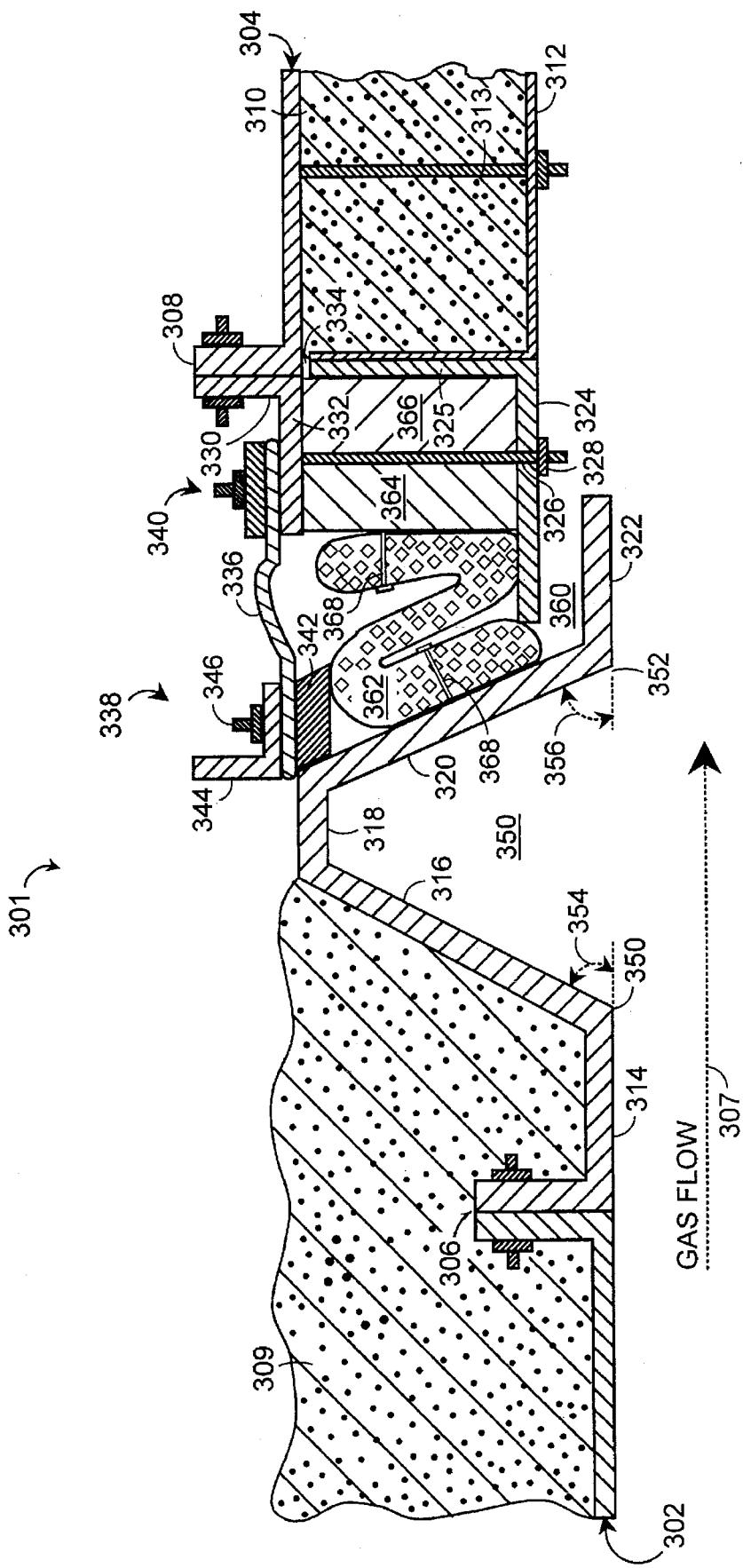
FIG. 3 is an expanded view of a section of a preferred expansion joint of the hot frame to cold frame type taken approximately along the rectangular plane 3 indicated in FIGS. 2(a) and 2(b)

FIG. 3 of the drawings shows a cross-sectional view, as indicated by the dotted rectangle 3 of FIGS. 2(a) and 2(b), of a preferred embodiment of a hot frame to cold frame type of expansion joint which utilizes the principles of the invention. In FIG. 3, an expansion joint, seen generally at 301, connects an inlet duct 302 to an outlet duct 304 via an inlet flange 306 and an outlet flange 308. The primary direction of gas flow from inlet duct 302, through expansion joint 301 and into outlet duct 304 is shown by arrow 307. Inlet duct 302 and outlet duct 304 are both preferably formed of metal, and may have a cross-section which is either circular or rectangular as seen in FIG. 2(a) or 2(b). Inlet duct 302 is an externally insulated duct of conventional type with the external insulation of the duct seen at 309. The external insulation is conventional and preferably takes the form of ceramic fiber or refractory. Outlet duct 304 is an internally insulated duct of conventional type with the internal insulation of the duct seen at 310. Outlet duct 304 typically includes a thin metal lagging 312 which shields the insulation 310 from the gas flow through the duct, and is clamped to the exterior of the duct via bolt 313. The insulation 310 is conventional and preferably takes the form of ceramic fiber which requires lagging as shown at 312 or refractory which does not require lagging 312.

Figure 3A:
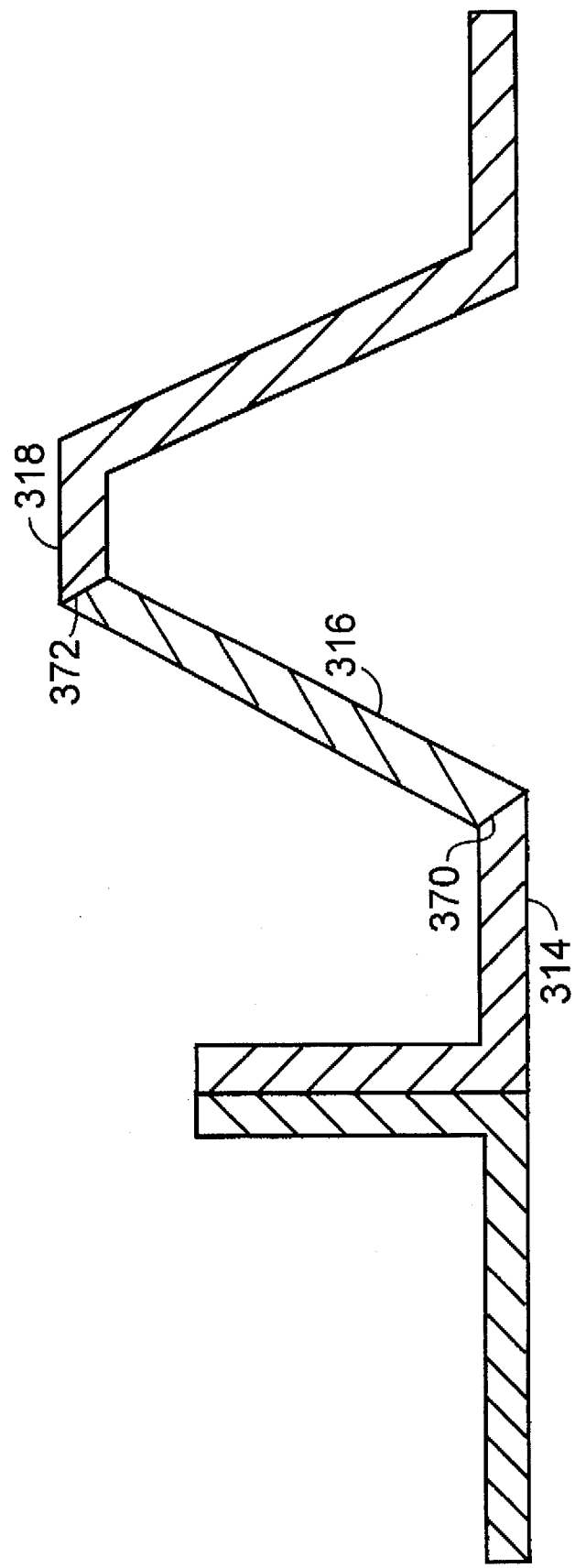
FIG. 3(a) shows alternative embodiments of the inlet figure of FIG. 3.

The expansion joint 301 includes an inlet frame which is preferably comprised of a first portion 314, a second portion 316 and a third portion 318. The three portions of the inlet frame are preferably formed of metal. The inlet frame may be formed of a single piece of metal as shown in FIG. 3 which includes all three portions or, in alternative embodiments, of two or three pieces of metal. If two pieces of metal are used, the first and second portions may be a single piece with the third portion being welded onto the second portion, or alternatively, the second and third portions may be a single piece of metal with the first portion being welded onto the second portion. FIG. 3(a) shows the welds at 370 and 372 of either of these embodiments. As will be appreciated by those skilled in the art in view of the present disclosure, the exact choice of the construction of the inlet frame will be influenced by a number of factors such as cost, and ease of fabrication.

The expansion joint 301 also includes an inlet liner which is preferably comprised of a first portion 320 and a second portion 322, which are both preferably formed of metal. Portions 320 and 322 are shown in FIG. 3 as being a single piece of metal, along with the inlet frame, but alternatively may be separate pieces of metal which are welded together. An outlet liner which is comprised of a first portion 324 and a second portion 325 is connected, via the first portion, by a bolt 326 and nut 328 to an outlet frame which consists of a first portion 330 and a second portion 332. The outlet liner, outlet frame, bolt 326 and nut 328 are all preferably formed of metal. The outlet liner is advantageously connected to the outlet frame in a manner as to leave an expansion gap 334 to allow for relative expansion and movement between the outlet liner and the outlet frame.

A flexible material 336 is connected to the inlet frame via an inlet fabric clamp seen generally at 338 and outlet fabric clamp seen generally at 340. Inlet fabric clamp 338 clamps the flexible material 336 to the inlet frame via a metal plate 342 which is welded to the third portion 318 of the inlet frame. Outlet fabric clamp 340 clamps the flexible material 336 to the second portion 332 of the outlet frame. The flexible material 336 is preferably a suitable flexible material or composite and is clamped by clamps 338 and 340 to form a seal which prevents escape of gas travelling from the inlet duct to the outlet duct.

The inlet fabric clamp 338 preferably consists of an L-shaped metal plate 344, the lower portion of which rests upon the flexible material 336. A bolting arrangement 346 preferably connects the L-shaped metal plate 344 to the metal plate 342 to form a seal. The outlet fabric clamp 340 is seen in FIG. 3 with a flate metal plate rather than an L-shaped metal plate, but may also utilize an L-shaped metal plate.

The expansion joint 301 is connected to the inlet duct 302 by bolting the first portion 314 of the inlet frame to a portion of the inlet duct 302 to form inlet flange 306. The expansion joint 301 is connected to the outlet duct 304 by bolting the first portion 330 of the outlet frame to a portion of the outlet duct 304 to form outlet flange 308.

The inlet frame and inlet liner are preferably shaped in a manner seen in FIG. 3 to form a channel 350 which is defined by: second and third portions 316 and 318 of the inlet frame, first portion 320 of the inlet liner, and points 350 and 352 which designate edges of the mouth of the channel 350. The sides of the channel 350 as defined by inlet frame portion 316 and inlet liner portion 320 are advantageously angled at an acute angle relative to the mouth of the channel. The second portion of the inlet frame forms a side of the channel 350 termed herein as a leading side, and the first portion of the inlet liner forms a side of the channel 350 termed herein as a trailing side.

In a preferred embodiment the sides of the channel 350 are angled at approximately a 45 degree angle from the mouth of the channel. In alternative embodiments, angles from 30 to 60 degrees may be used to advantage depending upon the rate of the temperature change experienced by the gas flowing through the expansion joint, in addition to the type of metal used for the inlet frame and inlet liner. The exact angle will vary depending upon the ease of fabrication to a particular angle. The shape of the duct, whether it is rectangular or circular, may also affect the exact angle of the sides of the channel.

Figure 8A:
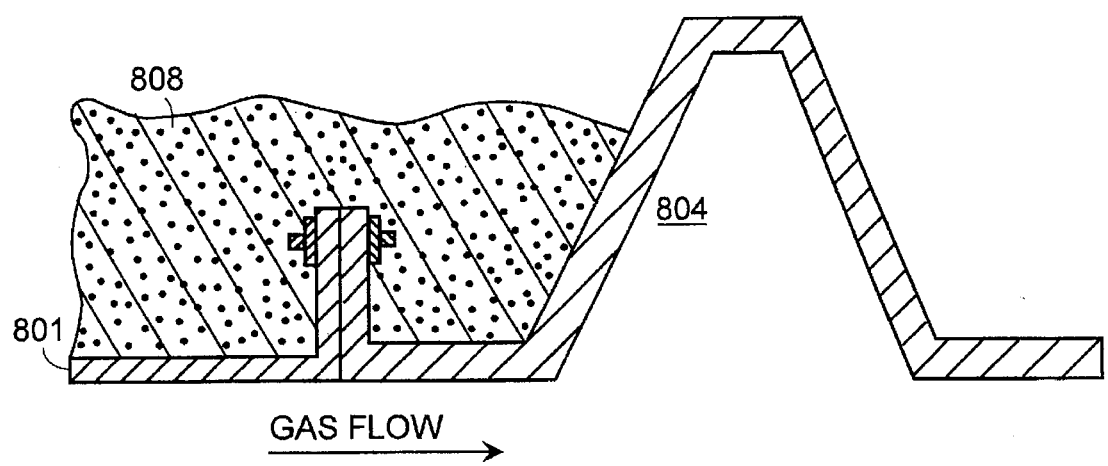
FIG. 8(a–b) are alternate embodiments of a portion of the expansion joints shown in FIGS. 3, 4 and 5.
Figure 8B:
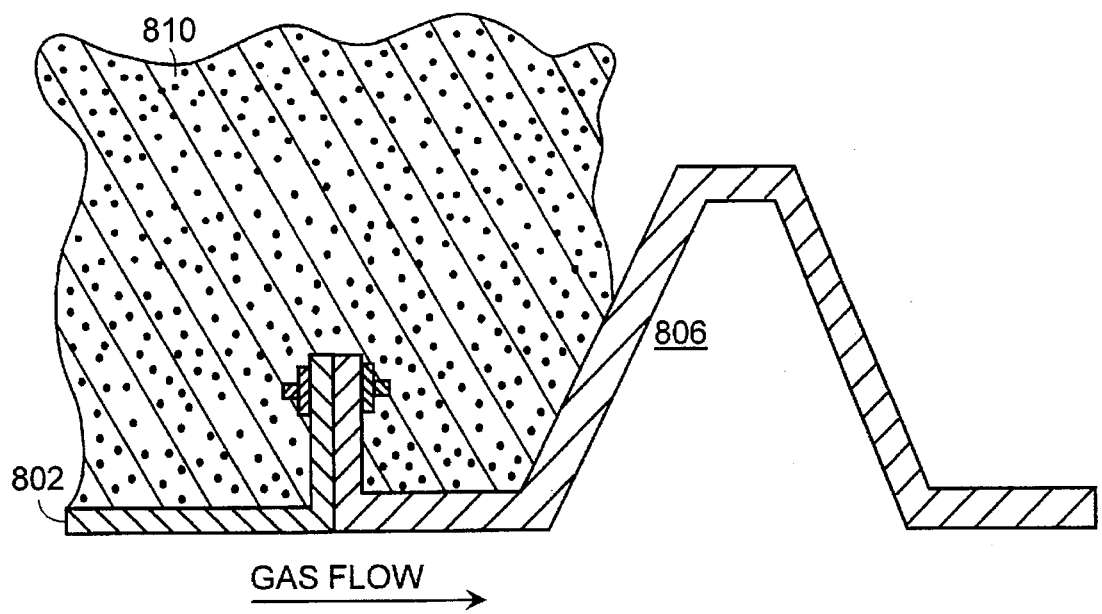

As can be seen in FIG. 3, the angle 354 of the inlet frame portion 316 and the angle 356 of the inlet liner portion 320 may also be defined as being an acute angle with respect to the primary direction of gas flow through the expansion joint, as designated by the arrow 307. The acute angles of the sides of the channel advantageously create a smooth transition area which allows a portion of the gas travelling through the expansion joint to enter the channel. The smooth transition area minimizes pressure losses between gas in the channel and outside the channel and creates improved eddy distribution, thus improving heat transfer to the inlet frame and inlet liner. As a result, the temperature differential existing between different portions of the inlet frame and liner, during periods of high temperature fluctuation in the gas travelling through the expansion joint, are reduced. A further advantage of the sloped sides of the channel is that such a frame can flex or distort more readily without building up stresses which would cause cracks or failures in the expansion joint. A further advantage is that the sloped sides of the channel simplify fabrication of the expansion joint, by allowing the inlet frame and liner to be fabricated from fewer pieces of metal. The sloped sides of the channel are easier to form from a single piece of metal, thus less welds have to be made to form the inlet frame and liner. An additional advantage, as will be explained in the description accompanying FIGS. 8(a) and 8(b) is that the sloped geometry allows the external insulation of the inlet duct to be easily varied to adjust the potential temperature differences existing along the inlet frame.

A section of the second portion 322 of the inlet liner preferably overlaps a section of the first portion 324 of the outlet liner, with the overlapping portion of the inlet liner being on the interior of the expansion joint with respect to the overlapping portion of the outlet liner. The inlet liner and the outlet liner are preferably formed and positioned to allow a spacing, seen at 360, between the two liners. This spacing advantageously allows for relative movement and expansion, along the axis and the radius of the expansion joint, between the inlet and outlet liners. Alternatively, the outlet liner attachment to the outlet frame may not require item 326/328. In such an embodiment, the outlet liner will be allowed to simply float with the radial movement of the inlet liner.

The expansion joint 301 preferably contains insulation disposed in the cavity created between the inlet liner, outlet liner, outlet frame and the flexible material. The insulation is preferably comprised of insulation in one or more forms to acoustically and thermally insulate the exterior of the expansion joint from the interior of the joint. As can be seen in FIG. 3, the insulation is comprised of blocks of insulation such as seen at 364 and 366, along with bundled blankets of insulation such as seen at 362 which fills the gaps not filled by the blocks of insulation. The bundled blankets 362 are flexible in order to take expansion joint movements, but are held in position by clips such as seen at 368 which connect the bundled blankets to the inlet and outlet liners, in order to maintain the positioning of the bundled blankets 362. The bolting arrangement 346 typically consists of metal studs, spaced four to eight inches apart which are welded to the inlet and outlet frame.

Figure 4:
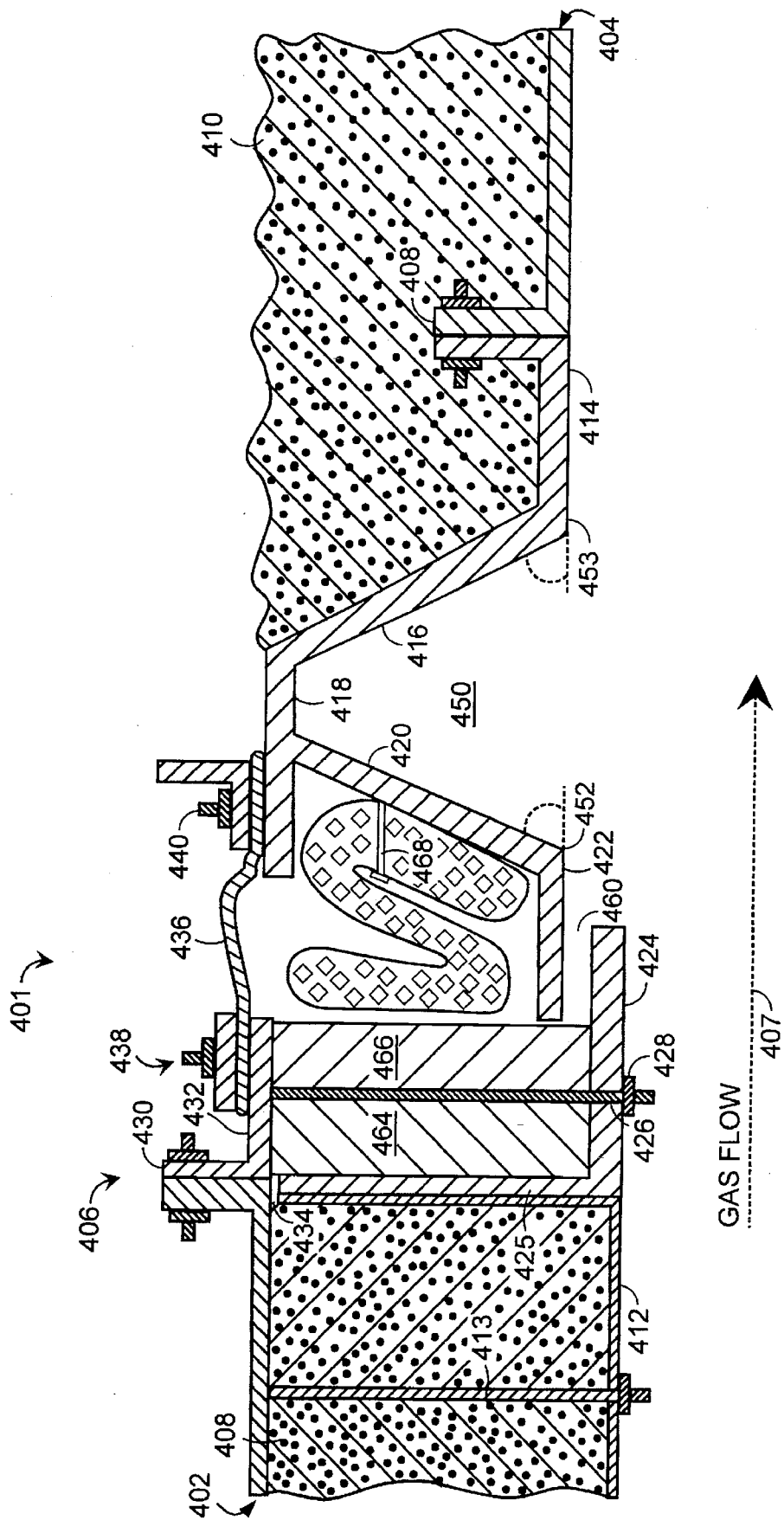
FIG. 4 is an expanded view of a section of a preferred expansion joint of the cold frame to hot frame type taken approximately along the rectangular plane 3 indicated in FIGS. 2(a) and 2(b)

FIG. 4 of the drawings shows a cross-sectional view, as indicated by the dotted rectangle 3 of FIGS. 2(a) and 2(b), of a preferred embodiment of a cold frame to hot frame type of expansion joint which utilizes the principles of the invention. In FIG. 4, an expansion joint, seen generally at 401, connects an inlet duct 402 to an outlet duct 404 via an inlet flange 406 and an outlet flange 408. The primary direction of gas flow from inlet duct 402, through expansion joint 401 and into outlet duct 404 is shown by arrow 407. Inlet duct 402 and outlet duct 404 are both preferably formed of metal, and may have a cross-section which is either circular or rectangular as seen in FIG. 2(a) or 2(b). Inlet duct 402 is an internally insulated duct of conventional type with the internal insulation of the duct seen at 408. The internal insulation is conventional and preferably takes the form of ceramic insulation with lagging or, alternatively, refractory without lagging. Inlet duct 402 includes a thin metal lagging 412 which shields the insulation 408 from the gas flow through the duct, and is clamped to the exterior of the duct via bolt 413. Outlet duct 404 is an externally insulated duct of conventional type with the external insulation of the duct seen at 410. The insulation 410 is conventional and preferably takes the form of ceramic insulation.

The expansion joint 401 includes an outlet frame which is preferably comprised of a first portion 414, a second portion 416 and a third portion 418. The three portions of the inlet frame are preferably formed of metal. The outlet frame may be formed of a single piece of metal which includes all three portions or, in alternative embodiments, of two or three pieces of metal. If two pieces of metal are used, the first and second portions may be a single piece with the third portion being welded onto the second portion, or alternatively, the second and third portions may be a single piece of metal with the first portion being welded onto the second portion. As with the inlet frame in FIG. 3, the exact choice of the construction of the outlet frame will be influenced by a number of factors such as cost, and ease of fabrication.

The expansion joint 401 also includes an outlet liner which is preferably comprised of a first portion 420 and a second portion 422, which are both preferably formed of metal. Portions 420 and 422 are shown in FIG. 4 as being a single piece of metal, but alternatively may be separate pieces of metal which are welded together. An inlet liner which is comprised of a first portion 424 and a second portion 425 is connected, via the first portion, by a bolt 426 and nut 428 to an inlet frame which consists of a first portion 430 and a second portion 432. The inlet liner, inlet frame, bolt 426 and nut 428 are all preferably formed of metal. The inlet liner is advantageously connected to the inlet frame in a manner as to leave an expansion gap 434 to allow for relative expansion and movement between the inlet liner and the inlet frame.

A flexible material 436 is connected to the inlet frame via an inlet fabric clamp, seen generally at 438, and to the outlet frame via an outlet fabric clamp, seen generally at 440. The inlet fabric clamp 438 and outlet fabric clamp perform a function as described in the description accompanying the fabric clamps shown in FIG. 3.

The expansion joint 401 is connected to the inlet duct 402 by bolting the first portion 430 of the inlet frame to a portion of the inlet duct 402 to form inlet flange 406. The expansion joint 401 is connected to the outlet duct 404 by bolting the first portion 414 of the outlet frame to a portion of the outlet duct 404 to form outlet flange 408.

The outlet frame and outlet liner are preferably shaped in a manner similar to that described for the inlet frame in FIG. 3. Channel 450 is defined by: second and third portions 416 and 418 of the outlet frame, first portion 420 of the outlet liner, and points 452 and 453 which designate edges of the mouth of the channel 450. The second portion 420 of the outlet liner forms the leading side of the channel 450 and the second portion 416 of the outlet frame forms the trailing side of the channel 450. The sides of the channel 450 as defined by outlet frame portion 416 and outlet liner portion 420 are advantageously angled at an acute angle relative to the mouth of the channel. The channel 450 provides advantages similar to those set forth in the description accompanying FIG. 3.

In a preferred embodiment the sides of the channel are angled at approximately a 45 degree angle from the mouth of the channel. In alternative embodiments, angles from 30 to 60 degrees may be used to advantage depending upon the factors set forth above in the description accompanying FIG. 3.

A section of the second portion 422 of the outlet liner preferably overlaps a section of the first portion 424 of the inlet liner, with the overlapping portion of the inlet liner being on the interior of the expansion joint with respect to the overlapping portion of the outlet liner. The outlet liner and the inlet liner are preferably formed and positioned to allow a spacing, seen at 460, between the two liners. This spacing advantageously allows for relative movement and expansion, along the axis and the radius of the expansion joint, between the inlet and outlet liners.

The expansion joint 401 preferably contains insulation disposed in the cavity created between the outlet liner, inlet liner, inlet frame and the flexible material. The insulation preferably takes a form similar to the insulation in the cavity described in FIG. 3 as do the bolting arrangements 438 and 440.

Figure 5:
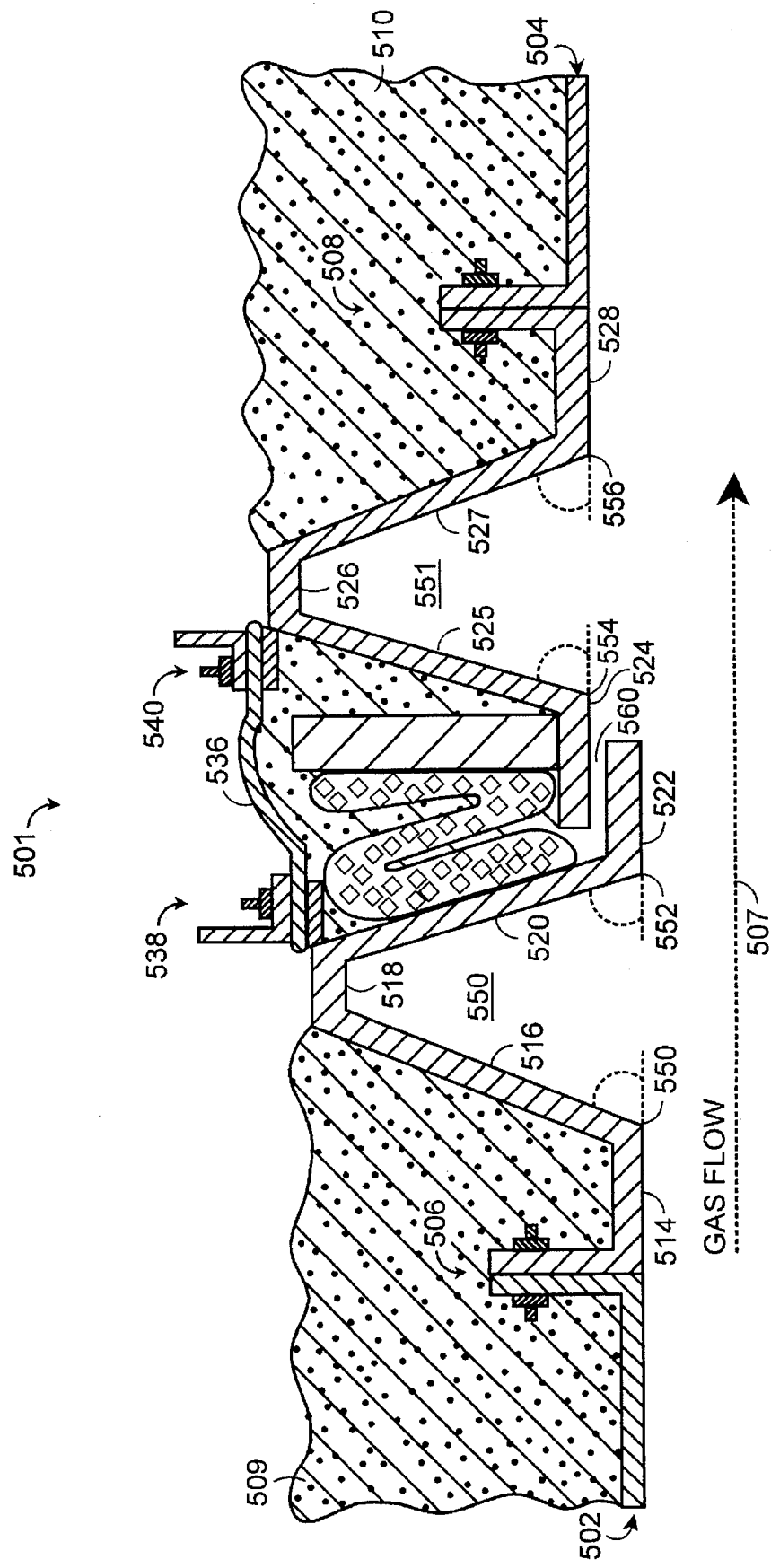
FIG. 5 is an expanded view of a section of a preferred expansion joint of the hot frame to hot frame type taken approximately along the rectangular plane 3 indicated in FIGS. 2(a) and 2(b)

FIG. 5 of the drawings shows a cross-sectional view, as indicated by the dotted rectangle 3 of FIGS. 2(a) and 2(b), of a preferred embodiment of a hot frame to hot frame type of expansion joint which utilizes the principles of the invention. In FIG. 5, an expansion joint, seen generally at 501, connects an inlet duct 502 to an outlet duct 504 via an inlet flange 506 and an outlet flange 508. As can be seen in FIG. 5, the expansion joint 501 includes a pair of channels, seen at 550 and 551, which are shaped in a manner similar to the channels shown in FIGS. 3 and 4. Channels 550 and 551 perform functions similar to the function performed by the channels shown in FIGS. 3 and 4.

The primary direction of gas flow from inlet duct 502, through expansion joint 501 and into outlet duct 504 is shown by arrow 507. Inlet duct 502 and outlet duct 504 are both preferably formed of metal, and may have a cross-section which is either circular or rectangular as seen in FIG. 2(a) or 2(b). Inlet duct 502 and outlet duct 504 are both externally insulated ducts of conventional type with the external insulation of the ducts seen at 509 and 510. The insulation 509 and 510 is conventional and preferably takes the form of ceramic fiber or refractory.

The expansion joint 501 includes an inlet frame which is preferably comprised of a first portion 514, a second portion 516 and a third portion 518. The inlet frame takes a form similar to the inlet frame shown in FIG. 3.

The expansion joint 501 also includes an inlet liner, which is preferably comprised of a first portion 520 and a second portion 522, which are both preferably formed of metal. The inlet liner takes a form similar to the inlet liner shown in FIG. 3. An outlet liner is comprised of a first portion 524, and a second portion 525, and an outlet frame is comprised of a first portion 526, a second portion 527 and a third portion 528.

A flexible material 536 is connected to the inlet frame via an inlet fabric clamp 538 and outlet fabric clamp 540. Inlet fabric clamp 538 and outlet fabric clamp 540 take a form similar to and perform a function similar to the fabric clamps described in the description accompanying FIG. 3.

The expansion joint 501 is preferably connected to the inlet duct 502 by bolting the first portion 514 of the inlet frame to a portion of the inlet duct 502 to form inlet flange 506. The expansion joint 501 is connected to the outlet duct 504 by bolting the third portion 528 of the outlet frame to a portion of the outlet duct 504 to form outlet flange 508.

The inlet frame and inlet liner are preferably shaped in a manner seen in FIG. 5 to form a channel 550 which is defined by: second and third portions 516 and 518 of the inlet frame, first portion 520 of the inlet liner, and points 550 and 552 which designate edges of the mouth of the channel 550. The sides of the channel 550 as defined by inlet frame portion 516 and inlet liner portion 520 are advantageously angled at an acute angle relative to the mouth of the channel. The outlet frame and outlet liner are shaped in a similar manner to form channel 551 similar to the channel 550. Channel 551 is defined by: second portion 525 of the outlet liner, first and second portions 526 and 527 of the outlet frame, and points 554 and 556 which designate the edges of the mouth of the channel 551.

In a preferred embodiment the sides of the channels 550 and 551 are angled at approximately a 45 degree angle from the mouth of the channel. As with the channels shown in FIGS. 3 and 4, the angle of the sides may vary between 30 and 60 degrees depending upon a variety of factors as already explained in the description accompanying FIG. 3.

A section of the second portion 522 of the inlet liner preferably overlaps a section of the first portion 524 of the outlet liner, with the overlapping portion of the inlet liner being on the interior of the expansion joint with respect to the overlapping portion of the outlet liner. The inlet liner and the outlet liner are preferably formed and positioned to allow a spacing, seen at 560, between the two liners. This spacing advantageously allows for relative movement and expansion, along the axis and the radius of the expansion joint, between the inlet and outlet liners.

The expansion joint 501 preferably contains insulation disposed in the cavity created between the inlet liner, outlet liner, and the flexible material. The insulation takes a form similar to the insulation in the cavity of FIG. 3, as do the bolting arrangements 538 and 540.

FIGS. 6(a–e) show alternative embodiments of the channel 330 of FIG. 3 or the channel 430 of FIG. 4, or the channels 530 and 531 of FIG. 5. The flow of gas in FIGS. 6(a–d) is designated by the arrow in each figure. As can be seen in FIGS. 6(a–d) the leading side of each of the channels is acutely angle with respect to the primary direction of gas flow through the expansion joint.

Figure 6A:
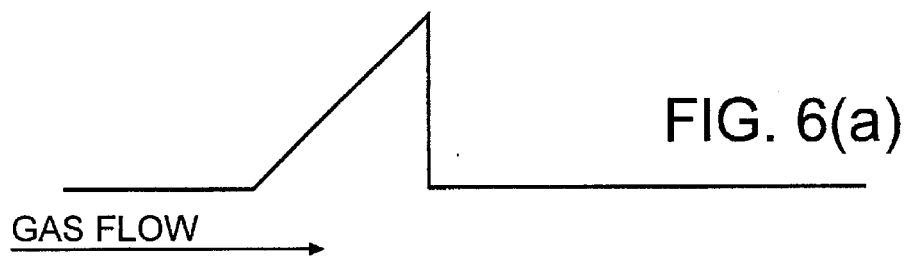
FIGS. 6(a–e) are alternate embodiments of the channel(s) of the expansion joints shown in FIGS. 3, 4 and 5.
Figure 6B:
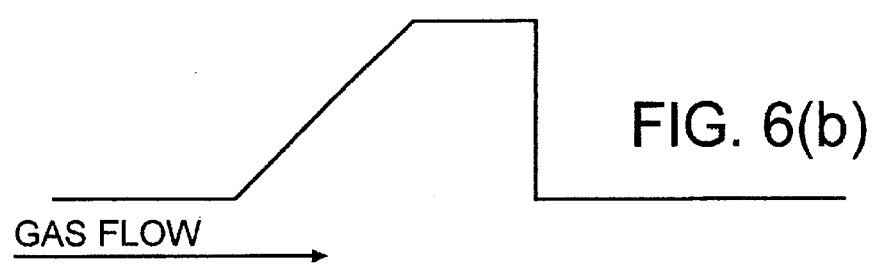
Figure 6C:
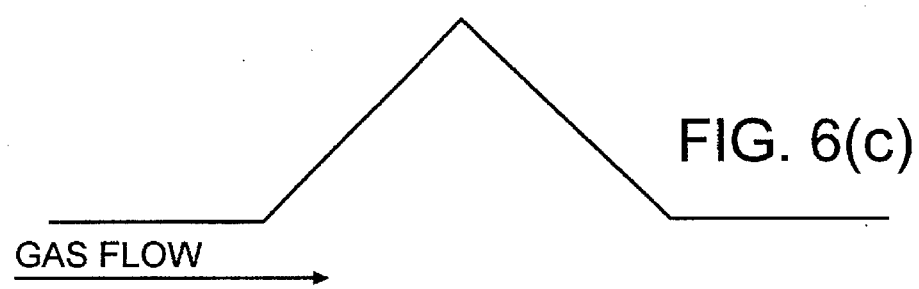
Figure 6D:
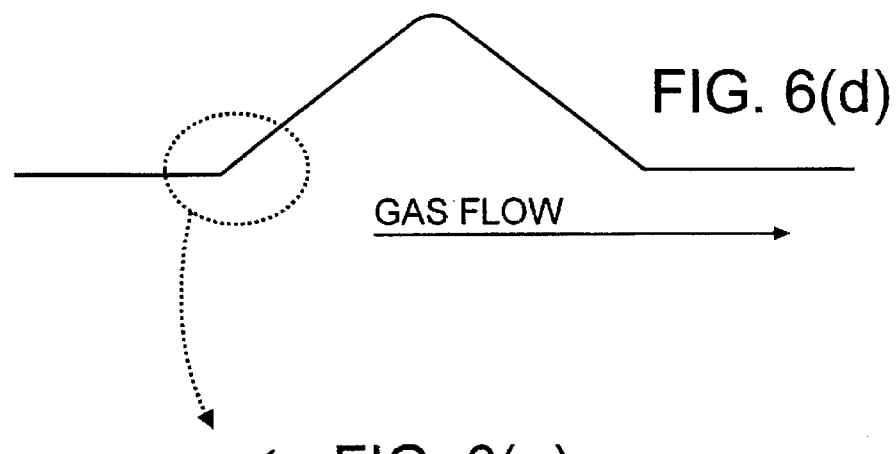
Figure 6E:

FIG. 6(a) shows a channel with a leading side which is acutely angled with respect to the direction of gas flow and a trailing side, connected directly to the leading side, which is perpendicular to the direction of gas flow. FIG. 6(b) shows a channel with a leading side which is acutely angled with respect to the direction of gas flow and a trailing side, connected to the leading side via a portion parallel to the direction of gas flow. In FIG. 6(b), the trailing side is perpendicular to the direction of gas flow. In FIG. 6(c), the leading and trailing sides are both acutely angled with respect to the direction of gas flow and are directly connected to one another to form a triangular shaped channel. In FIG. 6(d), the channel is shaped similarly to that shown in FIG. 6(c), with the exception that the joint between the leading edge and the trailing edge is rounded. In each of the embodiments shown in FIGS. 6(a–d), any or all of the joints may be rounded as shown in FIG. 6(e).

FIGS. 7(a–e) show partial cross-sections of preferred fabric clamps. Fig. 7(a) is an expanded view of the inlet and outlet fabric clamps shown in FIGS. 3 and 4, and FIGS. 7(b–e) show alternative embodiments of the inlet and outlet fabric clamps. The improved heat distribution in the frame (s) of the expansion joints shown in FIGS. 3, 4 and 5 results in increased temperatures in the frame near the fabric clamps. The embodiments shown in FIGS. 7(a–e) advantageously increase reliability of the fabric material by reducing the amount of heat to which the fabric material is exposed.

Figure 7A:
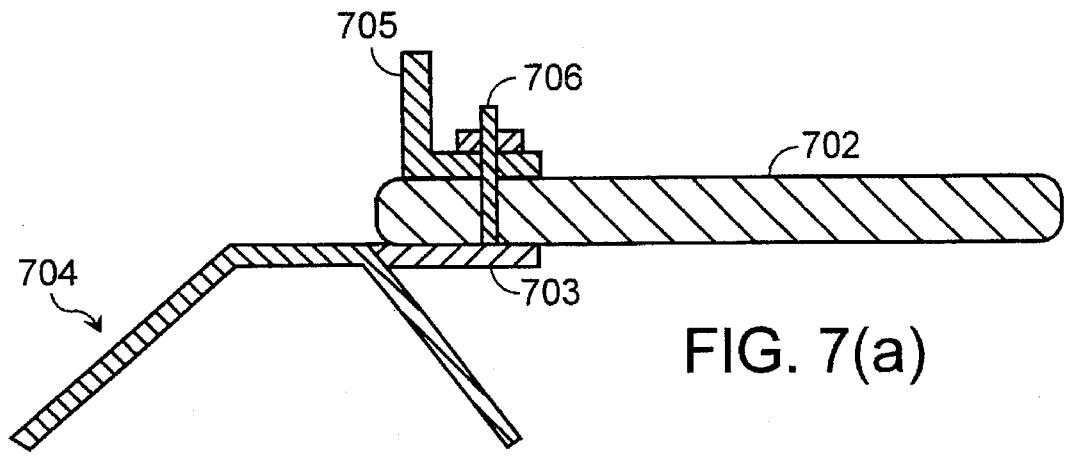
FIGS. 7(a–e) are alternate embodiments of a clamp shown in the expansion joint of FIGS. 3, 4 and 5.

In FIG. 7(a), fabric material 702 is secured to a portion 703 of frame 704 by an L-shaped clamp bar 705 which is fastened to the portion 703 by a nut and bolt combination 706. As can be seen, the L-shaped clamp bar 705 has a first portion which is positioned upon the fabric material and a second portion which extends outwardly from the expansion joint. The outward extending portion is better exposed to covective and radiation cooling and thus advantageously promotes cooling of the clamp.

Figure 7B:
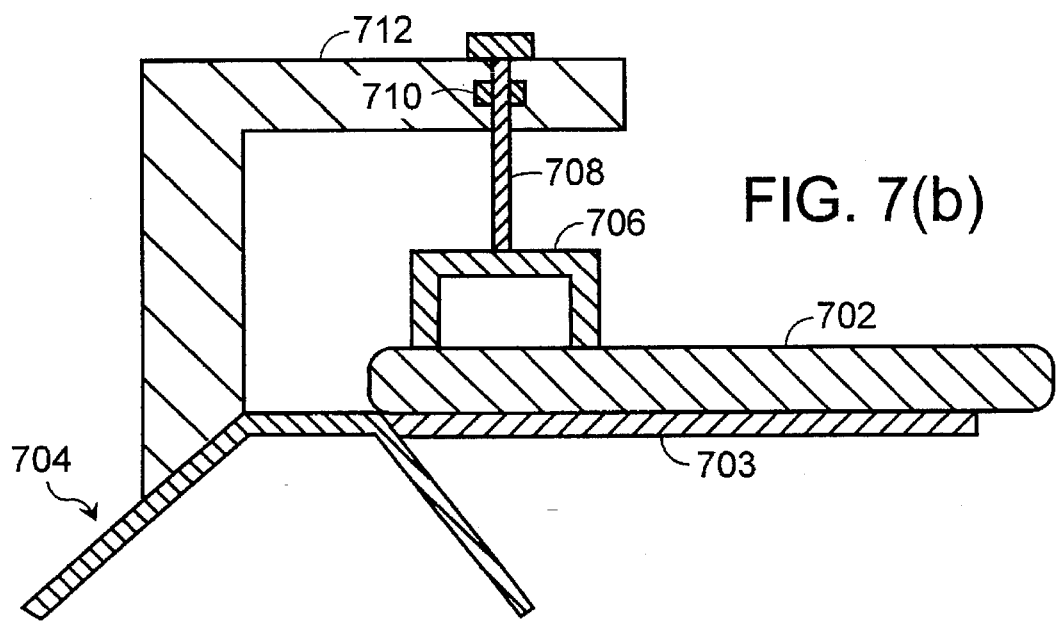
Figure 7C:
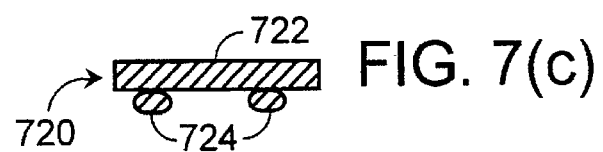

In FIG. 7(b), the flexible material 702 is clamped to portion 703 of frame 704 by clamp bar 706 which is secured against the flexible material 702 by a jacking bolt 708. As can be seen, the clamp bar is formed of a base, upon which the jacking bolt 708 rests, and first and second protruding portions which extend from the base to the fabric material 702. The jacking bolt 708 is threaded through a nut 710 disposed in bracket 712 which is preferably welded to a portion of the inlet frame. As can be seen, bracket 712 preferably takes an L-shape, with a first portion being welded onto frame 704 and a second portion containing nut 710. Such a clamping technique advantageously isolates hot studs, or hot metal portions, from the fabric area, thus reducing heat transfer from the interior of the expansion joint to the fabric material and clamp. An inlet frame is shown in FIG. 7(b) for illustrative purposes. However, the clamps shown in FIGS. 7(b–e) is equally well suited for clamping the flexible material to the outlet frame of an expansion joint. FIG. 7(c) shows an alternative embodiment of clamp bar 708 of FIG. 7(b). In FIG. 7(c), clamp bar 720 is comprised of a flat metal bar 722 with the first and second protruding portions taking the form of metal feet seen at 724 which are welded to one side of the bar. Such feet, like the integral outwardly protruding portions shown in FIG. 7(b), help retain and grip the fabric material and prevent leakage of gas in the expansion joint and slippage of the fabric material.

Figure 7D:
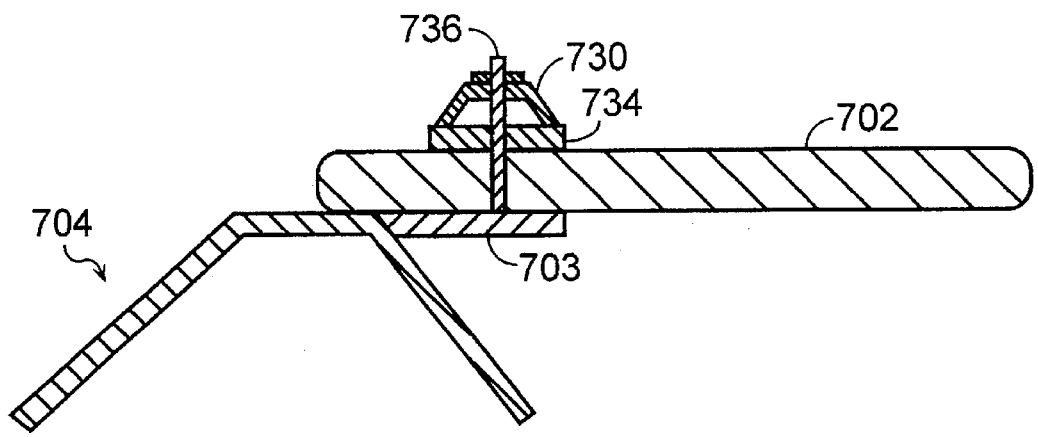
Figure 7E:
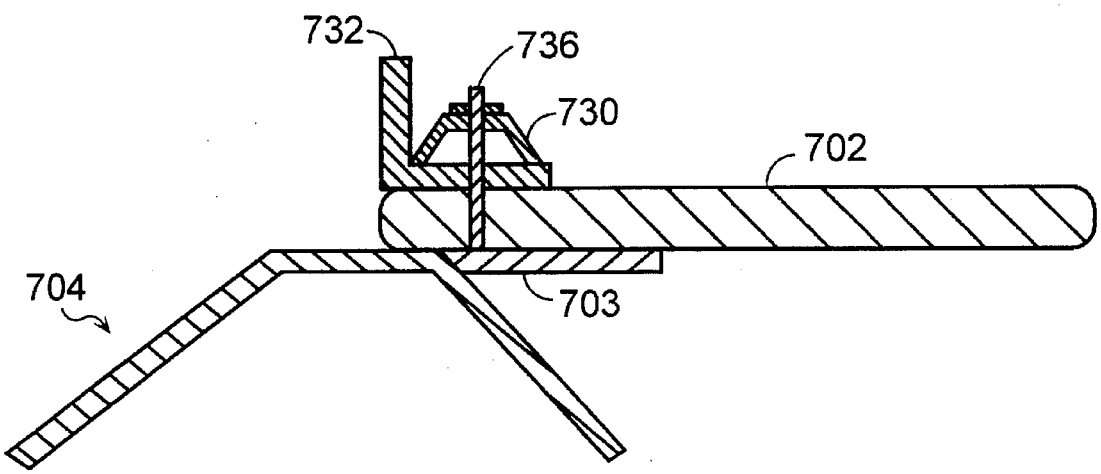

FIGS. 7(d) and 7(e) show additional preferred embodiments of a fabric clamp. The fabric clamps shown in FIGS. 7(d) and 7(e) utilize a beveled metal washer 730 to allow for radially outward expansion of the expansion joint frame without placing undue pressure on the flexible material. The beveled washer 730 is secured against a clamp bar 734 by a bolt 736 which is connected to a portion 703 of frame 704. The beveled washer 730 flexes as the hot frame, be it the inlet and/or the outlet frame, expands. Undue pressure and compression on the flexible material is thus reduced. FIGS. 7(d) show alternative embodiments of a fabric clamp utilizing a beveled washer. FIG. 7(e) shows an L-shaped clamp bar 732 and FIG. 7(d) shows a flat clamp bar 734. The beveled washer 730 and bar 732 or 734 are clamped against the flexible material 735 by bolt 736 to form a seal which prevents gas flowing through the expansion joint from escaping. The clamps shown in FIGS. 7(d) and 7(e), by allowing the fabric material to move in a radial direction relative to the clamp, advantageously prevent overcompression of the fabric material, thus retaining the insulating ability of the fabric and reducing the chance of a failure of the fabric due to excessive temperatures.

As can be seen, the clamp bar of FIGS. 7(a–e) are advantageously not directly connected to the inlet frame. The clamp bars shown in FIGS. 7(a–e) thus protect the flexible material from the higher temperatures which may exist in the inlet or outlet frames.

FIGS. 8(a) and 8(b) show alternative embodiments of an externally insulated duct 801 or 802. The sloped leading side of the channel 804 or 806 advantageously allows adjustment of the temperature differential, which may occur in the inlet frame, by varying the amount of insulation which covers the inlet frame. FIG. 8(a) shows an eternally insulated duct 801 in which the thickness of the insulation 808 is set to a thickness to leave an upper portion of the channel 804 exposed to ambient air temperature. FIG. 8(b) shows an externally insulated duct 802 in which the thickness of the insulation 810 is set to a thickness to completely insulate the channel 806. A partially exposed channel, as shown in FIG. 8(a), increases the temperature differential along the inlet frame while the fully insulated channel, as shown in FIG. 8(b), decreases the temperature differential along the inlet frame. The sloped leading edge of the channel advantageously allows the insulation to be varied to adjust for the temperature variations and stress exhibited in different applications.

It is to be understood that the specific mechanisms and techniques which have been described are merely illustrative of one application of the principles of the invention. Numerous modifications may be made to the methods and apparatus described without departing from the true spirit and scope of the invention.

What is claimed is:

1. An expansion joint comprising, in combination:
   a first flange which couples a first end of said expansion joint to a first duct;
   a second flange which couples a second end of said expansion joint to a second duct;
   a first frame and a first liner, combining to form a sloped channel, characterized by a mouth, said first frame comprising a first portion and a second portion, said first portion forming a portion of said first flange, said second portion angled at an acute angle with respect to the mouth of said channel to form a first wall of said channel, said first liner, comprising a first portion and a second portion, said first portion of said liner angled at an acute angle with respect to the mouth of said channel to form a second wall of said channel;
   a second liner, comprising a first portion and a second portion, an end portion of said first portion of said second liner overlapping an end portion of said second portion of said first liner;
   a second frame coupled to said second liner and comprising a first portion and a second portion, said second portion of said second frame forming a portion of said second flange; and
   a flexible material connected at a first end to said first frame and at a second end to said second frame.

2. An expansion joint comprising:
   an inlet frame and an inlet liner, connected to form a channel, characterized by a mouth, with at least one wall of the channel sloped with respect to the direction of gas flow, said gas flow passing from said inlet frame to said inlet liner, the sloped wall of the channel being acutely angled with respect to the mouth of the channel, a portion of said inlet frame connected said expansion joint to an inlet duct through which gas flows into the expansion joint;
   an outlet frame and an outlet liner, an end portion of said outlet liner overlapping an end portion of said inlet liner, the end portion of the inlet liner underlying the end part of the outlet liner with respect to the direction of gas flow through the expansion joint, a portion of said outlet frame connecting said expansion joint to an outlet duct into which gas flows from the expansion joint; and
   a flexible material connected at a first end to said inlet frame and at a second end to said outlet frame to allow relative axial and lateral movement of said first liner with respect to said second liner.

3. The expansion joint as set forth in claim 2 wherein a second wall of the channel is sloped with respect to the direction of gas flow, the second sloped wall of the channel being acutely angled with respect to the mouth of the channel.

4. The expansion joint as set forth in claim 3 wherein the expansion joint further comprises insulating material disposed between the flexible material, the first frame, first liner, second frame and second liner.

5. The expansion joint as set forth in claim 4 wherein the inlet duct is externally insulated.

6. The expansion joint as set forth in claim 5 wherein the outlet duct is internally insulated.

7. The expansion joint as set forth in claim 6 wherein the outlet liner is connected to the outlet frame in a manner to allow for expansion of the outlet liner with respect to the outlet frame.

8. The expansion joint as set forth in claim 7 wherein the inlet frame is formed of a single piece of metal.

9. The expansion joint as set forth in claim 7 wherein the inlet frame is formed of a first piece of metal which corresponds to said first portion and said second portion and a second piece of metal which corresponds to said third portion, said first and said second pieces of metal being welded together.

10. The expansion joint as set forth in claim 7 wherein the inlet frame is formed of a first piece of metal which corresponds to said first portion and a second piece of metal which corresponds to said second portion and said third portion, said first and said second pieces of metal being welded together.

11. The expansion joint as set forth in claim 7 wherein the inlet frame is formed of a first piece of metal which corresponds to said first portion, a second piece of metal which corresponds to said second portion and a third piece of metal which corresponds to said third portion, said first and said second pieces of metal being welded together, and said second and said third pieces of metal being welded together.

12. The expansion joint as set forth in claim 11 wherein the flexible material is connected to at least said inlet frame by a clamp which comprises:
   an L-shaped bracket having a first portion and a second portion, said first portion being connected to said frame;
   a clamp bar positioned between the second portion of the L-shaped bracket and the flexible material, said clamp bar having a base and at least a first protruding portion and a second protruding portion, which protrude from the same side of the clamp bar;
   a nut positioned within the second portion of the L-shaped bracket; and
   a jacking bolt which passes through the nut and which secures the first and second protruding portions against said flexible material to secure the flexible material to a portion of the frame.

13. The expansion joint as set forth in claim 11 wherein the flexible material is connected to at least said inlet frame by a clamp which comprises:
   a beveled washer;
   a nut positioned upon said beveled washer;
   a clamp bar positioned between the beveled washer and the flexible material; and
   a jacking bolt which is connected to said frame and which passes through said nut, said beveled washer and the flexible material, said jacking bolt securing said beveled washer against said clamp bar to secure said flexible material to said frame.

14. The clamp as set forth in claim 13 wherein the clamp bar is L-shaped with a first portion which is positioned between the beveled washer and the flexible material and a second portion which extends outwardly from the frame.

15. The expansion joint as set forth in claim 2 wherein the outlet frame and outlet liner are connected to form a channel with at least one wall of the channel sloped with respect to the direction of gas flow, the sloped wall of the channel being acutely angled with respect to the mouth of the channel.

16. The expansion joint set forth in claim 11 wherein the flexible material is connected to at least said inlet frame by a clamp which comprises:

a clamp bar positioned upon said flexible material;

a nut positioned upon said clamp bar; and a jacking bolt which is connected to said frame and which passes through said clamp bar and said nut, said jacking bolt securing said nut against said clamp bar to secure said flexible material to said frame.

17. The expansion joint set forth in claim 16 wherein the clamp bar is L-shaped with a first portion which is positioned between the nut and the jacking bolt and a second portion which extends outwardly from the frame.

* * * * *